Dec. 11, 1951  E. V. COLLINS  2,578,128
EARTH-MOVING APPARATUS
Filed April 26, 1946
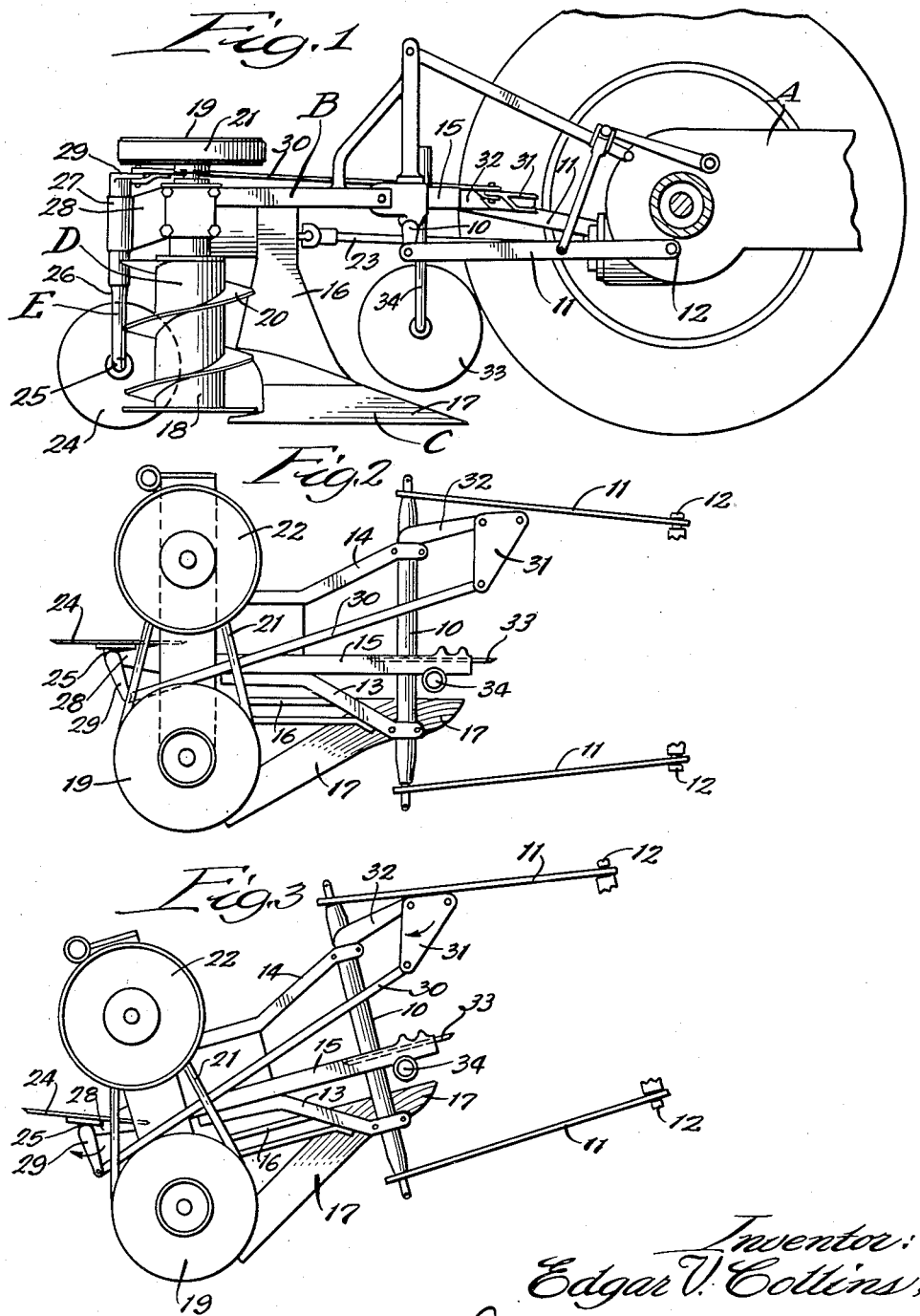

Patented Dec. 11, 1951

2,578,128

UNITED STATES PATENT OFFICE 2,578,128

EARTH-MOVING APPARATUS

Edgar V. Collins, Ames, Iowa, assignor to Iowa State College Research Foundation, Ames, Iowa, a corporation of Iowa Application April 26, 1946, Serial No. 665,127

6 Claims. (Cl. 97—43)

This invention relates to earth-moving apparatus. The invention is particularly useful in connection with tractor-drawn plows, terracing machines, and the like.

A problem in the use of tractor-drawn plows and terracing machines is developed where it is desired to turn very sharply to the left while following the terrace line. Here the side thrust of the plow is so great that the front wheels of the tractor tend to slip sidewise rather than pull the plow away from the furrow wall. A further problem is developed in connection with the great side thrust exerted by the rear portion of the plow or terracing machine against the furrow wall.

An object of the present invention is to overcome the above difficulties so as to provide for the heavy side thrust of the earth-moving machines or devices while, at the same time, enabling the earth-moving machine to be turned sharply to the left when desired.

A further object is to provide an earth-moving machine with a disc mounted at the extreme rear of the machine so as to take care of the side thrust of the structures while, at the same time, permitting a better control of the apparatus.

A further object is to provide a plow structure with a flatter moldboard or a structure in which the curved portion of the moldboard is cut away so as to cause vertical lifting of earth without moving the earth laterally a substantial distance.

Yet another object is to provide a steering disc behind the plow which runs preferably slightly deeper than the plow, thus compensating for the side thrust of the plow or other earth-moving member while, at the same time, permitting turning sharply to the left when the tractor is turned to the left, such turning being automatic. Other specific objects and advantages will appear as the specification proceeds.

The invention is illustrated, in a preferred embodiment, by the accompanying drawing, in which—

Figure 1 is a broken side view in elevation of apparatus embodying my invention; Figure 2, a top plan view; and Figure 3, a view similar to Figure 2, but showing the apparatus in position when a sharp turn to the left is made.

In the illustration given, A designates a tractor; B, a frame structure drawn by the tractor; C, a plowshare carried by the frame; D, a rotary mechanism for distributing earth in a lateral direction; and E, a disc supported at the rear of the frame.

The tractor A may be of any suitable type or construction. It is not a part of the invention herein and therefore need not be described in detail.

Supported upon the tractor A and drawn thereby is a frame structure B which also is of old construction. In this structure, there is provided a cross beam 10 to the ends of which are secured the rails 11. The rails 11 are connected to the tractor by well-known connections 12 which permit lateral swinging of the members 11. Similarly, the openings in the rails 11 receiving the ends of the cross bar 10 are large enough to permit the lateral swinging of bars 11.

Extending rearwardly from the cross bar 11 are the frame members 13, 14, and 15. Depending from the frame structure is a plow support member 16 carrying at its bottom a plowshare 17. The plowshare 17 is preferably so constructed as to lift the earth without moving it laterally any substantial distance. As shown, the moldboard that usually extends above the plowshare 17 is omitted, and instead, a substantially straight member 16 depends from the frame B and supports the plowshare 17 with a very small portion of the moldboard so that the earth slice is not turned over, but is simply held in front of the rotary structure D for distribution laterally by the member D.

The mechanism D is of well-known construction and is not claimed, per se, herein. The member 18 is mounted upon a fixed shaft to the top of which is secured the pulley 19. A spiral flange 20 is secured to the member 18. Since the structure 18 is old, detailed description is here believed unnecessary. The mechanism is shown more fully in my co-pending application, Serial No. 572,854 for drive units, The pulley 19 is driven by means of a belt 21 secured to a drive pulley 22. In turn, the shaft of the drive pulley 22 is driven by means of a rod 23 connected to the power take-off of the tractor A, as described more fully in my said above co-pending application, Serial Number 572,854.

The control disc structure E may be of any suitable form or construction. In the illustration given, I provide a disc member 24 equipped with a laterally extending arm 25 fixed to a vertical shaft 26. The shaft 26 is mounted within a collar 27, as shown more clearly in Figure 1 carried by the frame bracket 28. The upper end of the shaft 26 is provided with a laterally extending lever 29 pivotally connected to the control rod 30. The control rod 30 extends forwardly to a triangular plate member 31 to one corner of which it is pivotally connected. The plate 31 is pivotally connected at another corner to the rigid arm 32 mounted upon the cross shaft 10. With this structure, when the adjacent rail 11 swings inwardly, as shown in Figure 3, the triangular plate 31 is swung upon its pivot on fixed arm 32 so as to move the control rod 30 and thereby the guide disc 24.

In the illustration given, the frame B is provided with a depending disc 33 supported upon shaft 34, such a disc being of well-known construction and serving as a rolling coulter. It will be noted that the disc 33 is ahead of the plow C while the guide or control disc 24 extends rearwardly of the plow C and is deeper than the plowshare 17.

Structure is provided, as in the usual tractor-drawn frame, for lifting the frame upon the pivot bar 10 so that the frame and structure may, when desired, be carried completely upon the tractor A. Since such structure is well-known, it will not be described herein.

Operation

In the operation of the structure, the tractor is set in operation, and the plow is drawn along a furrow. Since the plowshare 17 has a very flat moldboard and no curved portion of the moldboard for turning the furrow slice, the side thrust against the guide disc 24 is considerably reduced, while, at the same time, earth is raised in front of the rotating member D which distributes such earth laterally of the frame B. Thus, a terrace is formed to the right of the frame. When it is desired to turn to the left, the rails 11, which lead to the tractor, are swung automatically from the position shown in Figure 2 to the position shown in Figure 3. Here, the adjacent rail 11 moves the triangular plate 31 to the position shown in Figure 3, and, by means of the connecting rod 30 and lateral extending arm 29, the disc 24 is turned to the position shown in Figure 3. In this position, the disc leads the frame structure directly away from the furrow wall and permits the plow and rotary member D to swing in a short circle around the tractor, and thus make an accurate left turn. When the tractor straightens again with respect to the drawn frame B, the rails 11 swing to their original position, as shown in Figure 2, and the disc 24 assumes its straight position, as illustrated in Figure 2, under the thrust against the furrow wall.

In trials, it is found that the structure may be turned easily within a twenty-four foot circle when operating at full depth; such a turn is shorter than would ever be required in terracing.

While the invention herein is described in connection with a rotary member D for terracing, it will be understood that the invention is also applicable to a plow structure and to other earth-moving devices. If desired, the rotary structure D may be omitted entirely and a plow C employed with or without its full moldboard.

While in the foregoing description, I have set forth one embodiment of the invention in great detail, it will be understood that the details thereof may be varied widely by those skilled in the art, without departing from the spirit of my invention.

I claim:

1. In combination with a tractor, a pair of rails connected thereby, a frame drawn by said rails, a vertical shaft rotatably mounted in said frame, a disk carried by said shaft, an earth-moving member mounted on said frame, an actuating member pivotally mounted upon said frame and adapted to be engaged by one of said rails when the tractor changes its course of direction, and a connecting member between said pivotally-mounted member and said shaft to rotate said shaft when said pivotally-mounted member is moved.

2. In combination with a tractor, a plow frame adapted to be drawn thereby, said frame being provided with a rigid cross bar, rails connecting the ends of the cross bar to side portions of said tractor, an earth-moving member mounted on said frame, a disk carried by a shaft rotatably mounted in said frame and extending to the rear of said earth-moving member and to a depth below said earth-moving member, said shaft being provided with a crank arm, a bracket carried by said cross shaft, an actuating member pivoted upon said bracket and adapted to be engaged by one of said rails, and a connecting rod between said crank arm and said actuating member whereby the sidewise movement of said rail effects the turning of said disk.

3. In a tractor-drawn frame, a pair of disks carried by said frame spaced-apart in longitudinal alignment, a plowshare mounted on said frame between said disks so as to cut a furrow having a longitudinal wall with respect to said frame, a rotary mechanism for distributing soil in a lateral direction mounted on said frame between said plowshare and the rearmost of said disks, said rotary mechanism being adapted to urge said frame in the direction of the furrow wall when in operation and to distribute soil in the opposite direction, and means for turning at least one of said disks out of said longitudinal alignment to assist in moving said frame away from said furrow wall.

4. In a tractor-drawn frame, a pair of disks carried by said frame spaced-apart in longitudinal alignment, a plowshare mounted on said frame between said disks so as to cut a furrow having a longitudinal wall with respect to said frame, a rotary mechanism for distributing soil in a lateral direction mounted on said frame between said plowshare and the rearmost of said disks, said rotary mechanism being adapted to urge said frame in the direction of the furrow wall when in operation and to distribute soil in the opposite direction, the rearmost disk being carried by a vertical shaft rotatably mounted in said frame and turnable to move said disk and said frame away from said furrow wall, and means for rotating said vertical shaft.

5. The structure of claim 4 in which the rearmost disk is lower with respect to said frame than the bottom of said plowshare and said front disk.

6. In combination with a tractor and a frame drawn thereby equipped with rails connected to the tractor, a pair of disks carried by said frame in longitudinal alignment and spaced-apart relation, a plowshare mounted on said frame between said disks and aligned to cut a furrow having a longitudinal wall, a rotary mechanism for distributing soil in a lateral direction mounted on said frame between said plowshare and the rearmost of said disks, said rotary mechanism being adapted to urge said frame in the direction of the furrow wall when in operation and to distribute soil in the opposite direction, said rear disk being carried by a vertical shaft rotatably mounted in said frame, a member pivotally mounted on said frame and adapted to be engaged by one of said rails, and a connecting rod between said pivotally-mounted member and said shaft adapted to rotate said shaft and said rear disk when said pivotally-mounted member is moved by engagement with said rail.

EDGAR V. COLLINS.

REFERENCES CITED

The following references are of record in the file of this patent:

UNITED STATES PATENTS

| Number | Name | Date |
|---|---|---|
| 1,547,778 | Barker | July 28, 1925 |
| 1,697,665 | Shields | Jan. 1, 1929 |
| 2,063,584 | Collins | Dec. 8, 1936 |
| 2,087,275 | Anderson | July 20, 1937 |
| 2,320,141 | Kott | May 25, 1943 |
| 2,322,342 | Bunn | June 22, 1943 |
| 2,342,031 | Bagan | Feb. 15, 1944 |
| 2,416,194 | Miller | Feb. 18, 1947 |

FOREIGN PATENTS

| Number | Country | Date |
|---|---|---|
| 117,907 | Great Britain | Aug. 15, 1918 |